United States Patent
McNeely et al.

(10) Patent No.: US 7,588,027 B2
(45) Date of Patent: Sep. 15, 2009

(54) ARTICULATED COOKING GRILL

(76) Inventors: James McNeely, 1040 Middleton Drive N.E., Calgary, Alberta (CA) T2E 6Z3; Kael James Forster Crichton, 83 Hidden Hills Way N.W., Calgary, Alberta (CA) T3A 5Y3

( * ) Notice: Subject to any disclaimer, the term of this patent is extended or adjusted under 35 U.S.C. 154(b) by 708 days.

(21) Appl. No.: 11/438,300

(22) Filed: May 23, 2006

(65) Prior Publication Data

US 2007/0272225 A1 Nov. 29, 2007

(51) Int. Cl.
*F24B 3/00* (2006.01)

(52) U.S. Cl. .................. 126/30; 126/25 A; 126/25 AA; 126/9 B; 99/393; 248/281.11

(58) Field of Classification Search .............. 126/30, 126/25 A, 9 R, 9 B; 99/393, 397, 449, 450; 248/274.1, 276.1, 278.1, 280.11, 281.11, 248/282.1, 284.1, 156
See application file for complete search history.

(56) References Cited

U.S. PATENT DOCUMENTS

| | | | |
|---|---|---|---|
| 2,603,454 A | | 7/1952 | Newton et al. |
| 2,698,726 A | | 1/1955 | Howe |
| 2,914,283 A | | 11/1959 | Jorgensen |
| 2,960,979 A | | 11/1960 | Stone |
| 3,045,660 A | | 7/1962 | Manley et al. |
| 3,067,734 A | * | 12/1962 | Lucas ........................ 126/30 |
| 3,632,085 A | | 1/1972 | Traywick |
| 3,785,360 A | | 1/1974 | Martin |
| 3,834,370 A | | 9/1974 | Nelson |
| 4,248,405 A | | 2/1981 | Kameda |
| 4,351,312 A | | 9/1982 | Ivy |
| 4,538,589 A | | 9/1985 | Preston |
| 4,607,608 A | | 8/1986 | Allred et al. |
| 4,979,490 A | | 12/1990 | Nudo et al. |
| 5,287,844 A | | 2/1994 | Fieber |
| 5,447,096 A | * | 9/1995 | Burge et al. .................... 99/339 |
| 5,746,118 A | | 5/1998 | Brunner et al. |
| D396,379 S | | 7/1998 | Stoetzl |
| 6,006,740 A | | 12/1999 | Ulrickson et al. |
| 6,070,571 A | | 6/2000 | Bradbury |
| 6,105,569 A | | 8/2000 | Andress |
| 6,827,077 B1 | | 12/2004 | Haas |
| 2004/0144379 A1 | | 7/2004 | Lewis |

FOREIGN PATENT DOCUMENTS

| | | |
|---|---|---|
| CA | 200271 | 5/1920 |
| CA | 254012 | 9/1925 |
| CA | 259703 | 4/1926 |
| CA | 605694 | 9/1960 |
| CA | 737246 | 6/1966 |
| CA | 2030717 | 5/1992 |

* cited by examiner

*Primary Examiner*—Alfred Basichas
(74) *Attorney, Agent, or Firm*—Anthony C. Edwards (57) ABSTRACT

A cooking grill assembly includes a foldable grill, wherein the components may be conveniently stored for transport, wherein the components include a lower support stake for insertion into soft ground or a free-standing base for use on hard ground, an upper extension post having at one of its ends a parallelogram linkage for vertically repositioning the cooking grill and for releasably securing the grill in a desired position, the other end of the upper extension post adapted to be rotatably mounted on the support stake.

19 Claims, 10 Drawing Sheets

ARTICULATED COOKING GRILL

FIELD OF THE INVENTION

This invention relates to a readily portable and articulate cooking grill which can be firmly positioned adjacent an open flame such as an outdoor campfire and which may be easily raised or lowered or swung rotationally, with respect to the flame, while maintaining the grill cooking surface horizontal.

BACKGROUND OF THE INVENTION

The enjoyment of meal preparation over an open flame such as a campfire is greatly decreased when a stable, horizontal cooking surface or grill is unavailable or where the cooking surface cannot be readily vertically repositioned relative to the flame to maintain a suitable cooking temperature. It is sometimes desirable to remove the grill by swinging away from the heat and/or smoke such that foods prepared may be manipulated, or for example, seasoned away from such nuisances so as to assist in cooking expertly. In addition, replenishing the fuel such as adding fresh firewood is assisted by easily raising the grill. Inspecting the food during the preparation is made more difficult unless the grill can be swung to one side away from the flame. Such articulation of the grill will also permit cooked food or liquids such as coffee to be kept warm by adjusting their proximity to the flame.

In the prior art it is known to use a parallelogram linkage pivotally mounted to an upright post, which enables the cooking surface of a grill mounted to the linkage to remain relatively horizontal whilst being raised or lowered relative to a campfire. Such devices generally rely upon the user to properly engage a locking mechanism when the cooking surface of the grill has been placed at the proper elevation. Such mechanisms are subject to failure due to improper engagement of the locking mechanism by the operator, wear of the mechanism or by placing cooking utensils on the cooking surface which have a weight sufficient to cause the locking mechanism to fail.

In the prior art the applicant is aware of U.S. Pat. No. 5,445,096 which issued Sep. 5, 1995, to Burge for a Horizontally and Vertically Movable Gridiron, wherein the locking mechanism comprises a hook which engages a semi-circular gear through spring action.

The applicant is further aware of U.S. Pat. No. 3,067,734, which issued Dec. 11, 1962 to Lucas for a Portable Barbecue, wherein the illustrated locking mechanism comprises a ratchet bar and pin.

SUMMARY OF THE INVENTION

The cooking grill assembly of the present invention is manufactured from rigid non-combustible materials such as mild steel or the like and comprises a foldable grill, wherein the components may be conveniently stored for transport. The components generally include a ground-engaging means such as a lower support stake for insertion into soft ground or a free-standing base for use on hard impenetrable ground. An upper extension post has at one of its ends means for vertically repositioning the cooking grill and for securing the grill in a desired position. The other end of the upper extension post is adapted to be rotatably mounted on the support stake. An intermediate support post may also be utilized where additional height above the fire would be preferable.

According to one embodiment of the present invention articulated cooking grill may be characterized as including:

a) a foldable cooking grill, which in its folded aspect forms a convenient storage and carrying case and in its extended aspect provides a sturdy flat cooking surface,
b) a lower support stake which can be hammered into the ground in proximity to a campfire,
c) an upper extension post adapted at its lower end to be rotatably mounted on the support stake and having secured at its upper end a parallelogram linkage to which the grate of the foldable cooking grill may be removably mounted so as to be vertically and horizontally repositionable adjacent to a campfire.
d) actuating means in the form of an elongate handle is rigidly mounted to the upper arm of the parallelogram linkage. The fore end of the handle may be a threaded rod or the like. The aft end of the handle may have a slidable tubular covering to which a locking lever is hingedly mounted wherein the weight of the cooking grill and any utensils, etc. placed thereon forces the handle to rotate downwardly thus ensuring a solid contact with the locking device. The handle provides sufficient mechanical advantage as to permit vertical and horizontal relocation of weighty objects.

DETAILED DESCRIPTION OF EMBODIMENTS OF THE INVENTION

Figure 1:
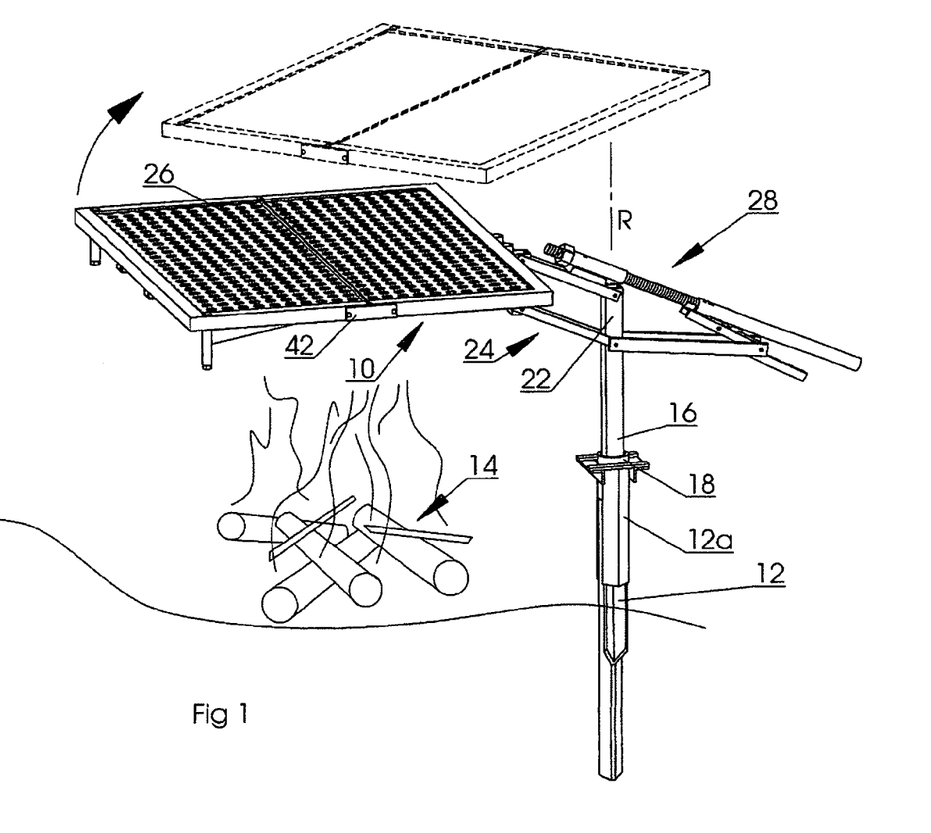
FIG. 1, is a schematic view of the articulated cooking grill of the present invention positioned adjacent an outdoor fire.
Figure 2:
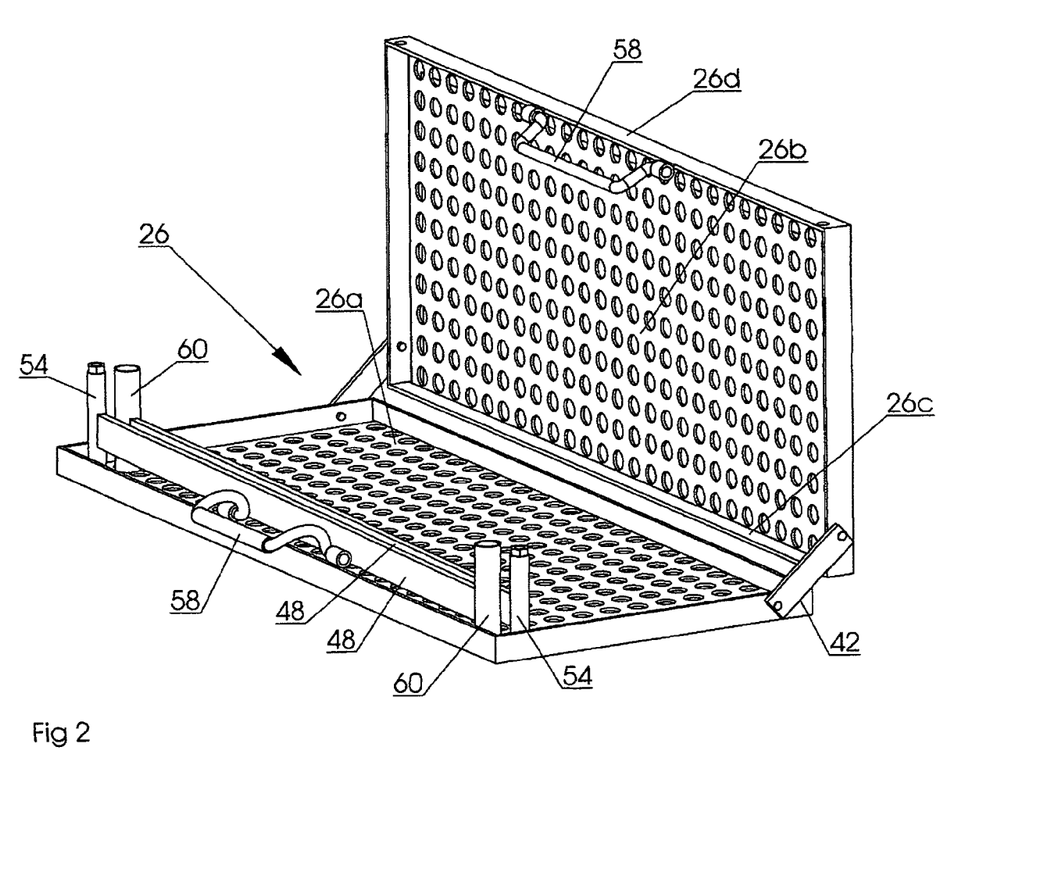
FIG. 2 is a perspective view of the cooking grill partially unfolded.

With reference to the drawing figures, wherein similar characters of reference denote corresponding parts in each view, Articulated Cooking Grill 10 has a lower support stake 12 which is adapted to be firmly driven into the ground at a suitable location adjacent to a cooking fire 14. A cooking grill or grate 26 mounts onto the upper end of stake 12. If additional height above fire 14 is necessary to keep grate 26 sufficiently elevated, an intermediate support stake 12a may be provided. Stake 12 is inserted into the upper end of lower support stake 12 so as to extend the length of the stake, and grate 26 then mounted on top of stake 12a by means of post 16.

Post 16 has a collar 18 at its lower end which snugly slides over the upper end of stake 12a or of stake 12. Collar 18 allows post 16 to rotate relative to stake 12 or 12a about a vertical axis of rotation R coincident with the longitudinal axes of the stakes. A parallelogram linkage 24 is mounted on upper end 22 of post 16 for vertically repositioning the cooking grate 26. A handle and locking mechanism combination 28 is mounted to the linkage.

Figure 4:
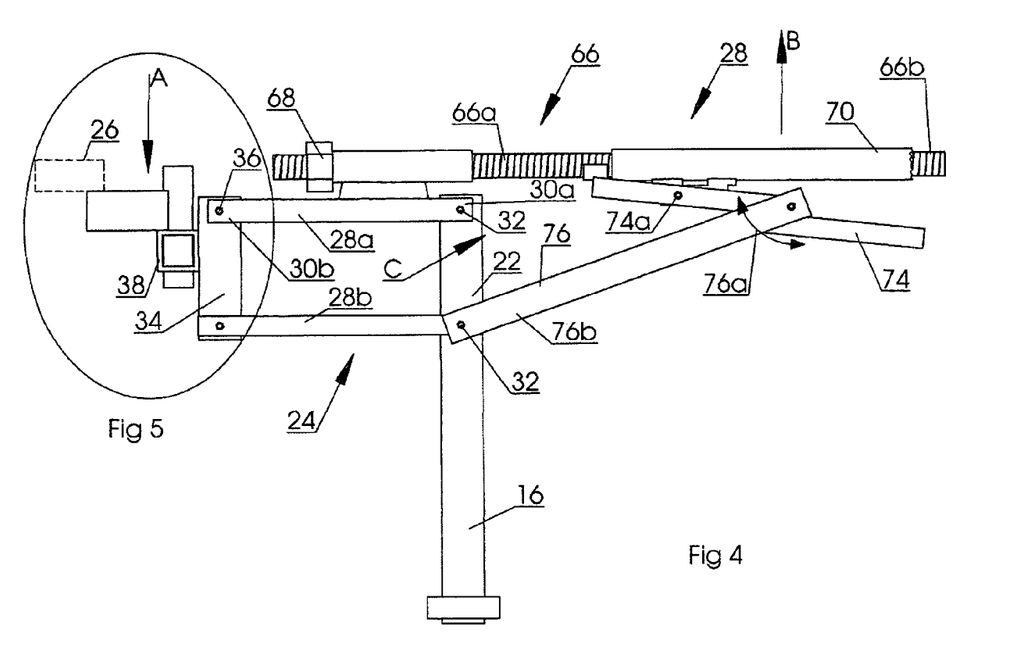
FIG. 4 is a side elevation of the parallelogram linkage, actuating and locking mechanism.
Figure 5:
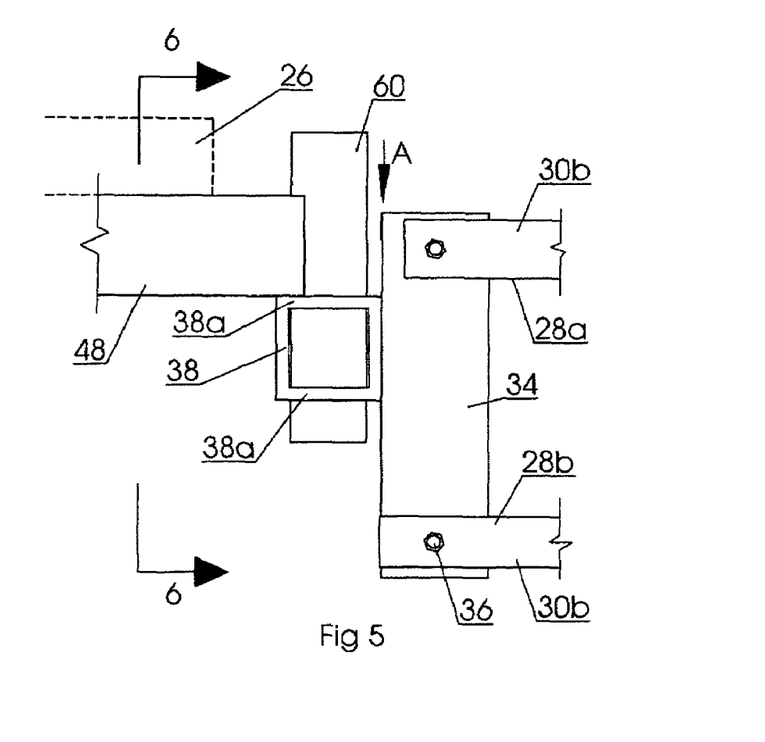
FIG. 5 is an enlarged view of a portion of FIG. 4.
Figure 6:
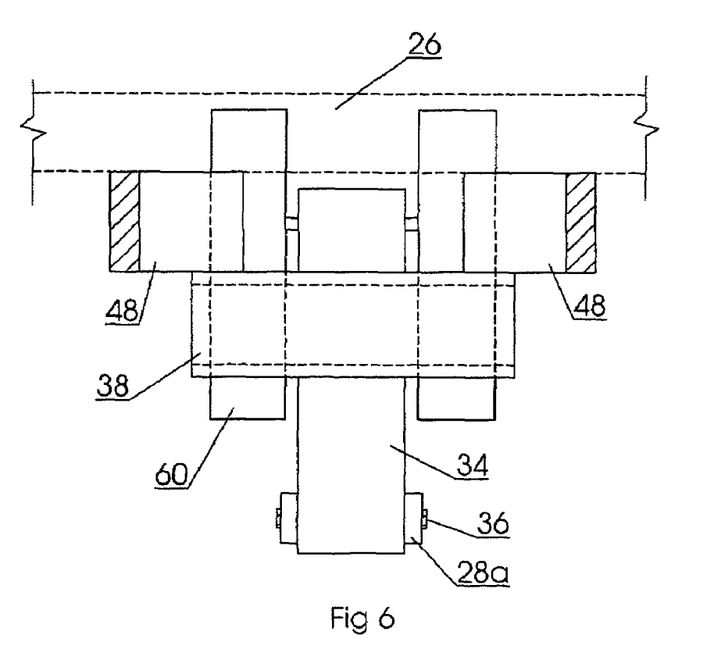
FIG. 6 is a sectional view taken on line 6-6 FIG. 5.

Linkage 24 is in the form of a parallelogram having upper and lower arms 28a and 28b. Arms 28a and 28b are pivotally mounted at their proximal ends 30a to upper end 22 of post 16 by bolts 32. The distal ends 30b of arms 28a and 28b are pivotally fastened to a vertical connecting arm 34 by bolts 36 or the like.

Receiving means 38, which may be an apertured bar to which grate 26 of cooking grate 26 may be removably mounted, is fastened as by welding or the like to vertical connecting arm 34. As illustrated, the receiving means 38, in one form, may be a horizontally disposed length of hollow steel pipe rectangular or square in cross-section and containing a pair of spaced apart vertical through-apertures 38a.

Grate 26 may be rectangular in shape and may include two hollow rectangular sections 26a and 26b, hinged as by hinge arms 42 so as to be foldable, one section over the other so as to be opposed facing to thereby form storage and transportation case for the other components comprising of the cooking grill. When unfolded about hinge arms 42, as may be seen in FIG. 3, grate 26 is supported and braced so as to form a single rigid planar cooking surface by a pair of supporting arms 48 mounted underneath the grate. Arms 48 are pivotally secured to the interior corners 50, of one grate section, for example section 26a, opposite hinge arms 42. Supporting arms may be fixedly secured to a steel tube 54 through which bolt 56 passes to pivotally secure arms 48 to the frame of grate 26. A pair of carrying handles 58 are mounted to opposite edges of the grate. When arms 48 are carried within the folded sections, handles 58 interlock to function as a single carrying handle protruding from between the folded sections of the grate.

Figure 3:
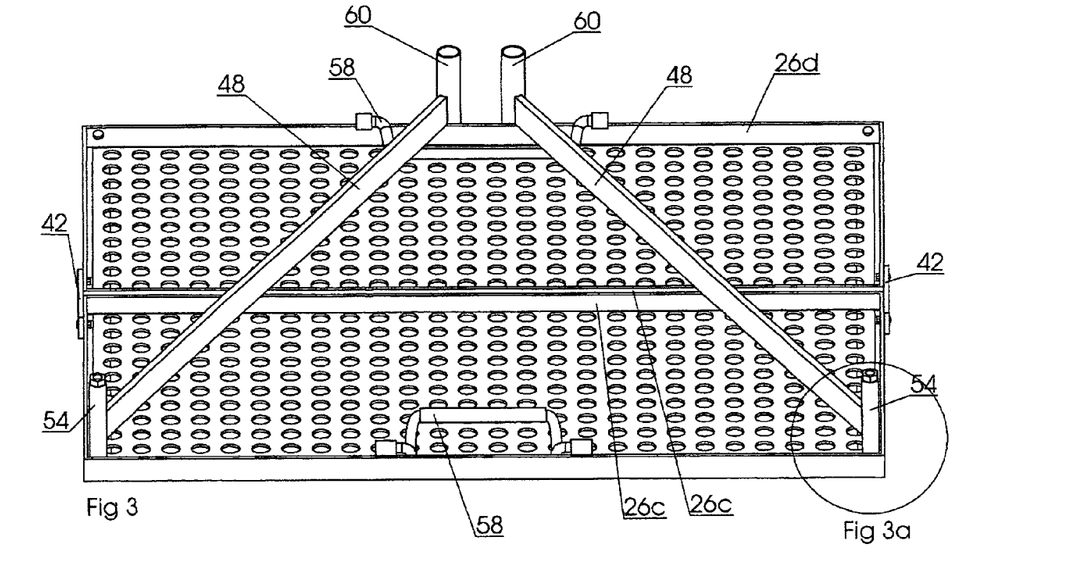
FIG. 3 is a perspective view of the cooking grill and the support arms unfolded.
Figure 3A:
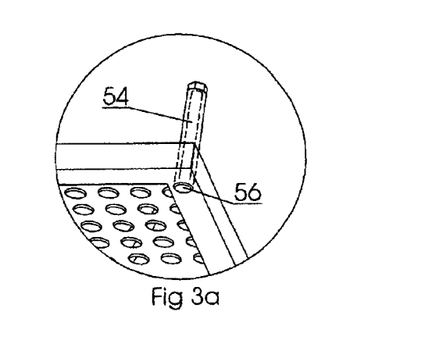
FIG. 3a is an enlarged view of a portion of FIG. 3.

When arms 48 are swung across the adjacent medial edges 26c of the unfolded grate sections, supporting arms 48 extend slightly beyond the outer perimeter edge 26d of the adjacent grate section. Pins 60 or the like fixedly secured to and depending from the distal ends of the supporting arms, are inserted into the vertical through apertures 38a of the receiving means 38 at the distal end of parallelogram linkage 24 thereby removably mounting grate 26 firmly to linkage 24.

Actuating means 28 for cooking grill 10 includes an elongate handle 66, which is rigidly mounted as by welding or the like to the upper arm 28a of parallelogram linkage 24. Handle 66 extends outwardly of the upper extension post 16 opposite to the grate 26 and linkage 24.

Figure 10:
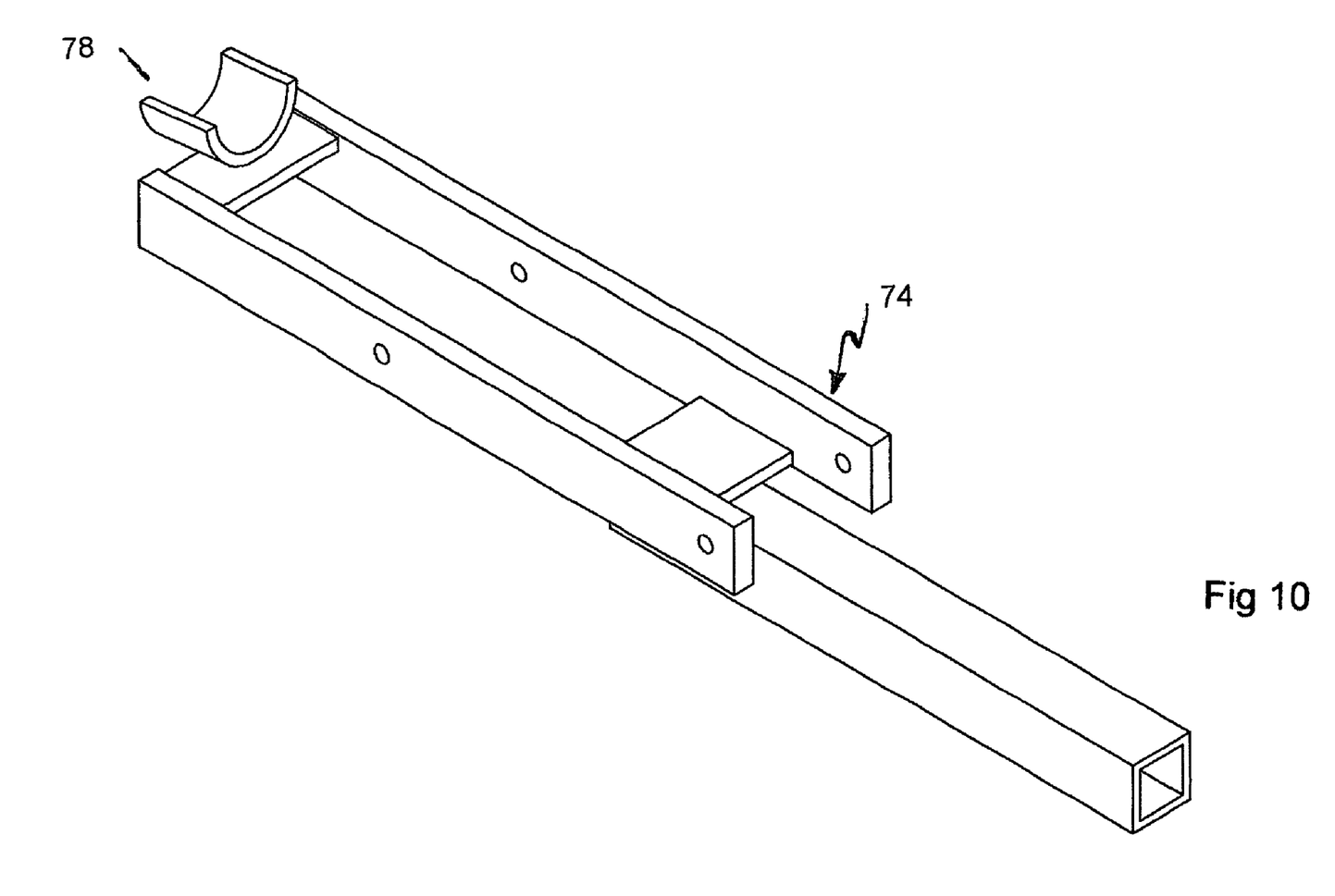
FIG. 10 is a perspective view of the unitary locking lever of the present invention.
Figure 11:
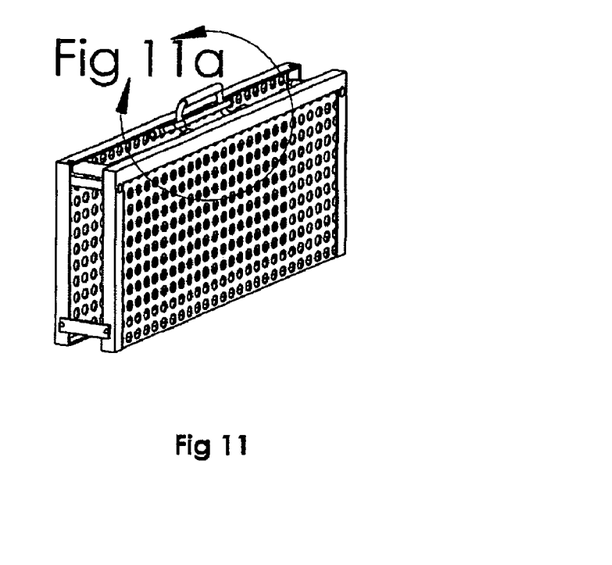
FIG. 11 is, in perspective view, the articulated cooking grill according to the present invention in its closed position for storage and transportation.
Figure 11A:
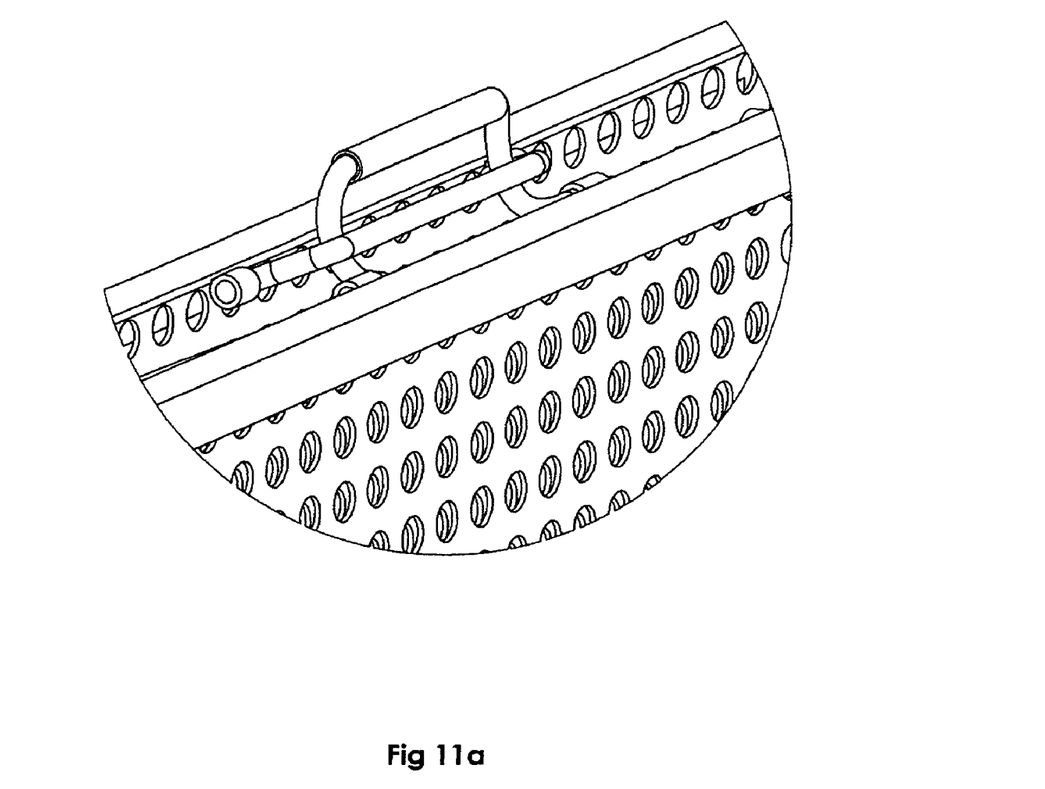
FIG. 11a is, in enlarged partially cut away view, a portion of the closed cooking grill of FIG. 11 illustrating the interlocking handles interlocking to hold together the two sides of the closed cooking grill while being carried by the sole upstanding handle hooked under and through the opposite handle.

Handle 66 has a threaded forward end 66a. End 66a is in threaded engagement in threaded nut or sleeve 68 mounted to upper arm 28a, permitting longitudinal adjustment of the length of handle 66 extending rearwardly relative to the parallelogram linkage 24. A slidable tubular sleeve 70 is slidably mounted over rearward end 66b of handle 66. A unitary locking lever 74, better seen in FIG. 10, is pivotally mounted to handle 66 at pivot pin or bolt 74a. A further rigid linkage arm 76 is pivotally mounted at its distal end 76a to lever 74. The opposite proximal end 76b of arm 76 is pivotally mounted to, post 16, co-terminating with lower arm 28b of linkage 24. A stop such as half-collar 78 is mounted at the end of lever 74, so as to engage the threaded end 66a of handle 66.

Figure 7:
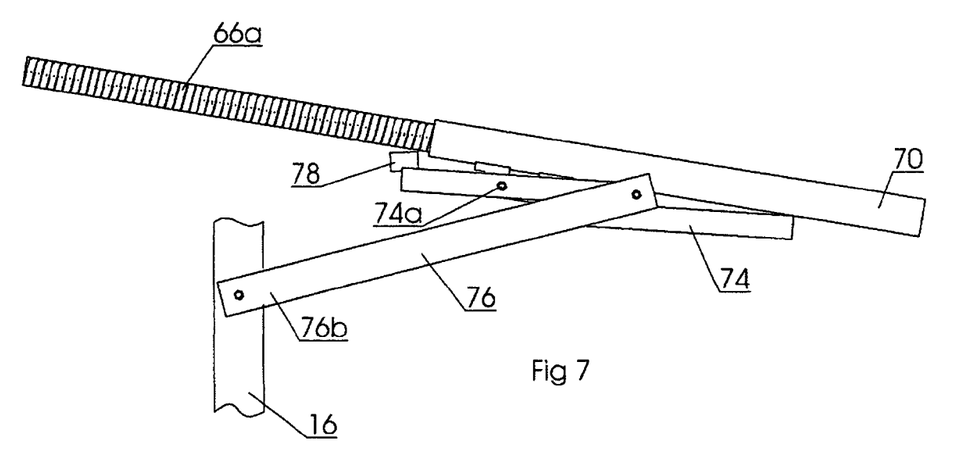
FIG. 7 is a partially cutaway side elevation view of the actuating handle and the locking mechanism of FIG. 4 with the locking mechanism in the release position.
Figure 8:
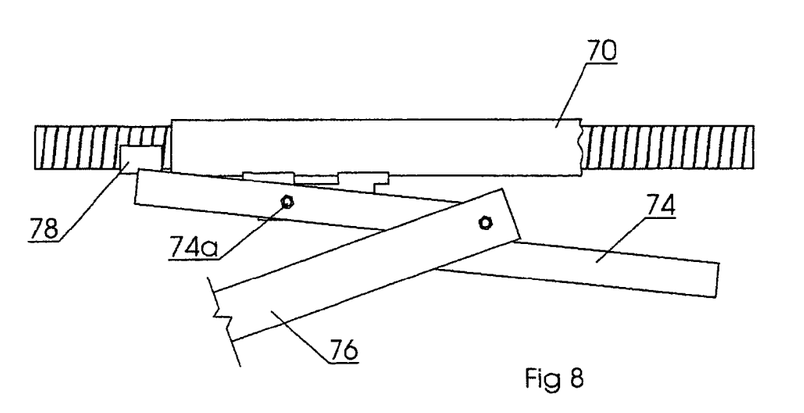
FIG. 8 is the side elevation view of FIG. 7 with the locking mechanism in the locked position.

As handle 66 and locking lever 74 are drawn together, as may be seen in FIG. 7, threaded half-collar 78 is released from engagement with threaded end 66a of handle 66. As handle 66 and locking lever 74 are separated as may be viewed in FIG. 8, half-collar 78 is returned into engagement with threaded end 66a of handle 66, so as to mesh the threads of half-collar 78 with the threads of end 66a thereby locking and preventing further movement of sleeve 70 along threaded end 66b.

A safety feature or self-locking aspect of this device will become apparent by viewing FIG. 4. The collective weight of grate 26 and of anything resting on the grate exerts a downward force in direction A, which rotates distal ends 30b of arms 28a and 28b also in direction A. Handle 66 then rotates so as to translate in the opposite direction, direction B, by virtue of being rigidly mounted to, or formed as an extension of, so as to remain parallel to arm 28 which pivots on bolt 32 in direction C. Pivot pin 74a is also translated in direction B. Linkage arm 76, however, being pivotally connected to locking lever 74 distally from pivot 74a urges engagement of the threads of half-collar 78 against the threads off threaded end 66a of handle 66, by forcing lever 74 to rotate in direction D as pivot pin 74a rotates so as to translate in direction B.

Consequently, if a user lets go of handle 66, locking lever 74 automatically engages the threads of end 66a so as to stop the grate from dropping. In this fashion, the handle may be conveniently operated because the locking lever 74 need only be pulled that is raised, toward handle 66 and slider 70 when it is desired to lower the grate. Lifting the grate is simply done by merely lowering handle 66 that is, slider 70, which automatically disengages half-collar 78 from the threads on end 66a and re-engages them upon the downward travel of handle ceasing, a slight upward translation then re-setting the half-collar against the threads to lock and prevent further upward movement of the handle. Thus palm-only pressure is all that is required to lower the handle and thereby raise the grill. The automatic re-setting of the half-collar against the threads to prevent further vertical movement of the grate provides a safety feature when the handle is bumped accidentally.

Thus by grasping handle 66, and in particular sleeve 70, and the rearward end of lever 74 and urging the two together, the locking of half-collar 78 against end 66a is released and end 66b may then be elevated to lower grate 26. Releasing of lever 74 then resets the locking of half-collar 78 against end 66a to lock grate 26 at the desired elevation. At all times grate 26 may be rotated by rotating handle 66, so as to rotate post 16 about axis R relative to stakes 12 and 12a.

Figure 9:
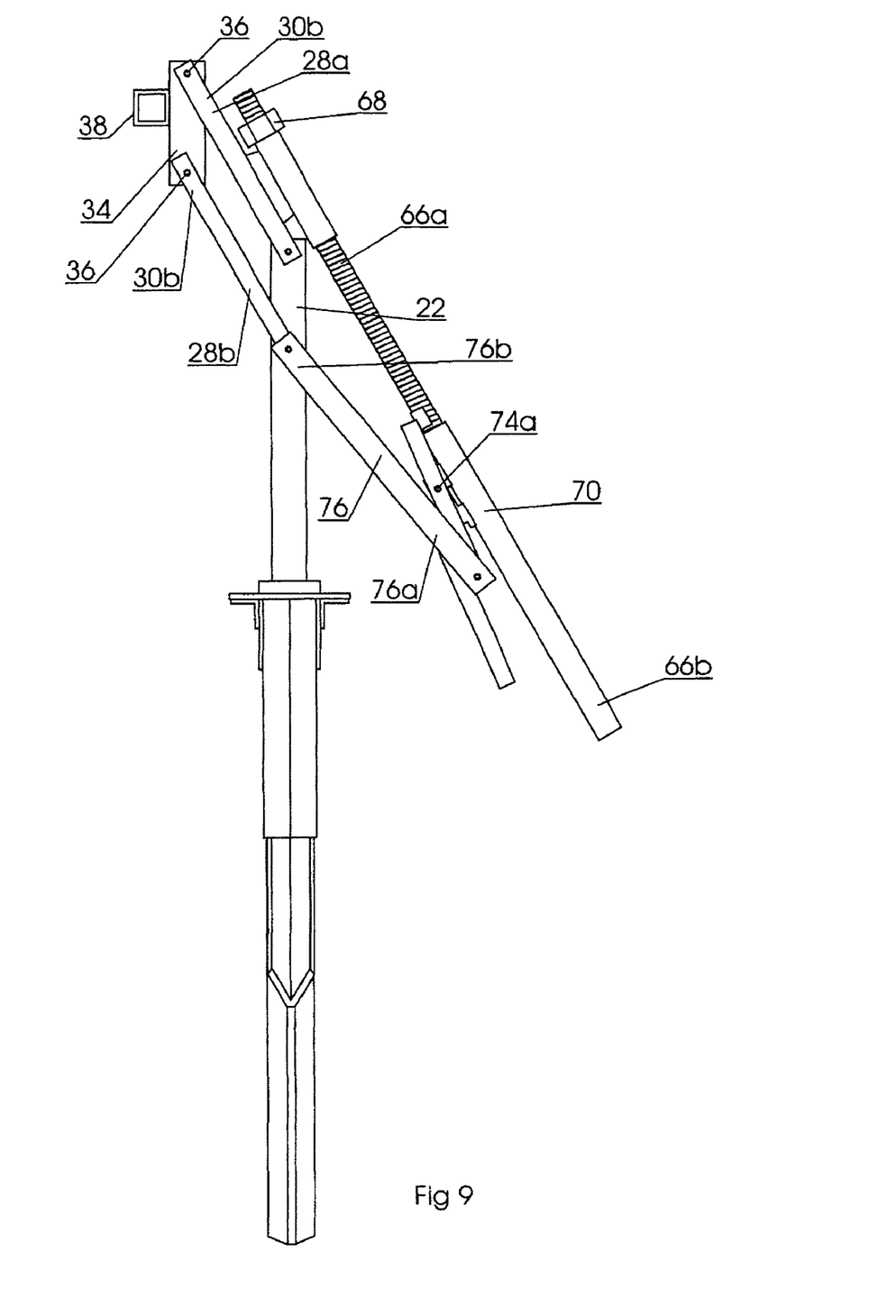
FIG. 9 is the view of FIG. 4 with the grill elevated and locked into position.
Figure 9A:
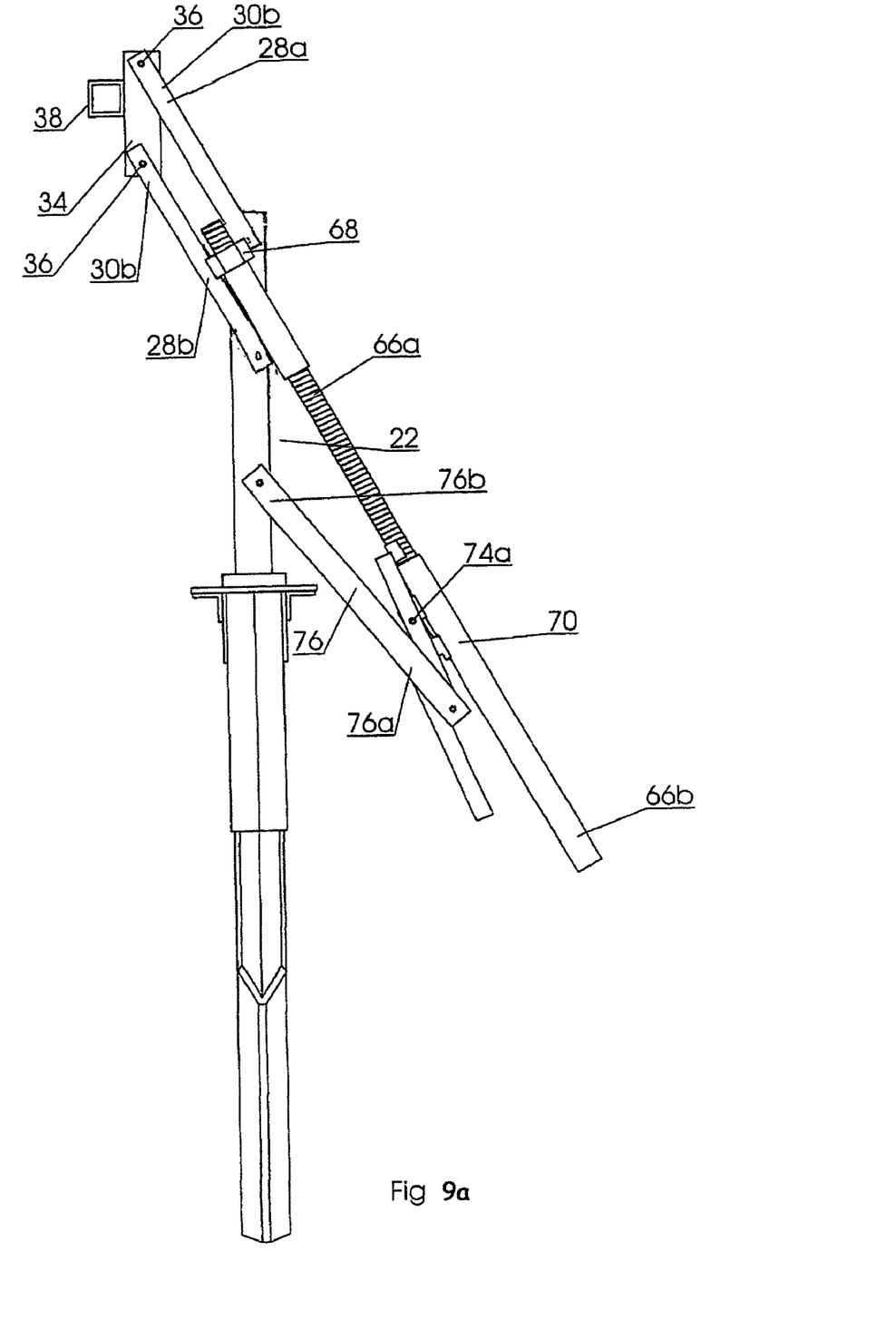
FIG. 9a is an alternative embodiment of the cooking grill of FIG. 9 wherein the handle is mounted to a lower of the parallelogram arms.

As seen in FIG. 9a, in an alternative embodiment, the actuator comprising handle 66, slide 70 and linkage arm 76 may be positioned differently. The nut 68 and its mount may be mounted to the side or underside of arm 28b, only having to ensure the required clearances and repositioning of pivot point 76b on post 16.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. An articulated cooking grill comprising:
   post mountable so as to be stable and substantially vertically on the ground by ground engaging means,
   a parallelogram linkage comprising a parallel pair of arms vertically spaced apart and pivotally mounted at first ends thereof to an upper end of said post, said parallelogram linkage extending from a forward side of said post, an elongate cross member having opposite upper and lower ends pivotally mounted at said upper and lower ends to second ends of said pair of arms, said second ends opposite said first ends, a horizontal cooking platform removably mountable to and so as to be cantilevered from said cross-member so that said platform extends away from said parallelogram linkage and said post, an elongate handle extending rearwardly from one arm of said pair of arms so as to extend oppositely from said cooking platform and so as to extend from a rearward side of said post opposite said forward side of said post, wherein said handle includes a portion having a downwardly disposed first mating surface, a slide slidably mounted on said handle, said slide having a grasping portion, said slide extending rearwardly of said first mating portion and slidable over said handle relative to said first mating portion, a pivot arm pivotally mounted to a lower side of said slide, a first end of said pivot arm having an upward disposed second mating surface, an elongate brace pivotally mounted at a first end thereof to said post, a second end of said brace, opposite said first end of said brace, pivotally mounted to said pivot arm, a lever extending rearwardly from said second end of said pivot arm for grasping by a user simultaneously with the user grasping said grasping portion of said slide, wherein urging together of said grasping portion of said slide and said lever lowers said second mating surface from locking engagement with said first mating surface whereby said handle may be elevated to lower said platform, and wherein releasing of said urging together of said grasping portion of said slide and said lever rotates said pivot arm so as to elevate said second mating surface and said first end of said pivot arm, due to said platform rotating said second ends of said pair of arms downwardly to thereby rotate said handle upwardly, thereby driving said second mating surface into mating engagement with said first mating surface, and wherein lowering of said handle disengages said first and second mating surfaces and raises said platform.

2. The apparatus of claim 1 wherein said brace is pivotally mounted to said pivot arm substantially mid-way between said first end of said pivot arm and a second end of said pivot arm opposite said first end of said pivot arm.

3. The apparatus of claim 2 wherein said first end of said brace is pivotally mounted to said post so that said first end of said brace is co-terminus on said post with said first end of a lower arm of said pair of arms.

4. The apparatus of claim 1 wherein said cross member includes a coupler mounted thereto for releasable coupling with said platform and wherein said platform includes at least one coupling member extending therefrom for releasable mating with said coupler.

5. The apparatus of claim 4 wherein said at least one coupling member includes at least one substantially vertical pin.

6. The apparatus of claim 5 wherein said platform includes at least one cross-brace reinforcing an underside of said platform, and wherein said at least one substantially vertical pin extends downwardly from said at least one cross-brace.

7. The apparatus of claim 6 wherein said at least one substantially vertical pin extends from an end of said at least one cross-brace.

8. The apparatus of claim 7 wherein said at least one cross-brace includes a pair of elongate cross-braces extending across said underside of said platform, and wherein said at least one substantially vertical pin includes a pair of pins mounted one at each end of first ends of said pair of elongate cross-braces so as to extend downwardly therefrom, and wherein said coupler includes a corresponding pair of apertures for snug mating with said pair of pins.

9. The apparatus of claim 8 wherein second ends of said pair of elongate cross-braces, opposite said first ends of said pair of elongate cross-braces, are mounted to distal corners of said platform, distal from said coupler when said platform is mounted thereto.

10. The apparatus of claim 9 wherein said platform bi-folds about a bi-fold hinge along a centre-line of said platform.

11. The apparatus of claim 10 wherein said underside of said platform defines first and second cavities in corresponding first and second half-sections of said platform, said first and second half sections disposed on opposite sides of said centre-line.

12. The apparatus of claim 11 wherein said first and second half sections pivot about said centre-line on hinges mounted therebetween so that, in an open position, upper surfaces of said half-sections form a contiguous planar surface opposite said underside of said platform, and wherein, in a folded position, said half-sections are folded over, about said centre-line, into opposed facing relation to form a compartment between said half-sections.

13. The apparatus of claim 12 wherein said pair of elongate cross-braces are rotationally mounted to said underside of said platform, and, when rotated under said underside of said platform, and said half sections in said folded position, said cross-braces store in said compartment.

14. The apparatus of claim 1 wherein said first and second mating surfaces are corrugated surfaces for mating interlocking when urged together so as to mate corrugation on said first mating surface with corrugations of said second mating surface.

15. The apparatus of claim 14 wherein said corrugations are threaded-surface corrugations.

16. The apparatus of claim 1 wherein said handle is threaded along substantially its entire length and threadably mounted at a first end thereof to a threaded couple mounted to an upper arm of said pair of arms.

17. The apparatus of claim 1 wherein said post has at least upper and lower co-linear sections and wherein said upper section is rotatably mounted to said lower section for rotation of said upper section relative to said lower section about a substantially vertical axis of rotation, and wherein said pair of arms are pivotally mounted to said upper section.

18. The apparatus of claim 3 wherein said ground engaging means includes a ground penetrating stake mounted so as to be downwardly disposed from said post.

19. The apparatus of claim 17 wherein said ground engaging means includes a ground penetrating stake mounted so as to be downwardly disposed from said post.

* * * * *